United States Patent [19]

Richards

[11] Patent Number: 4,527,511
[45] Date of Patent: Jul. 9, 1985

[54] PET BATH AND LITTER BOX COMBINATION

[76] Inventor: Henry B. Richards, Box 1395, Star Rte., Lillian, Ala. 36549

[21] Appl. No.: 575,907

[22] Filed: Feb. 1, 1984

[51] Int. Cl.$^3$ .................... A01K 1/035; A01K 13/00
[52] U.S. Cl. ............................... 119/1; 119/158
[58] Field of Search ............................ 119/1, 158

[56] References Cited

U.S. PATENT DOCUMENTS

| | | | |
|---|---|---|---|
| 3,318,285 | 5/1967 | Betham | 119/1 |
| 3,793,987 | 2/1974 | Rogers | 119/1 |
| 4,117,555 | 10/1978 | Dennis | 119/1 |
| 4,316,433 | 2/1982 | Hebert | 119/158 |
| 4,407,234 | 10/1983 | Kleman | 119/158 |

FOREIGN PATENT DOCUMENTS

WO79/00458  7/1979  PCT Int'l Appl. .................. 119/1

Primary Examiner—Robert P. Swiatek

[57] ABSTRACT

This pet bath and litter box combination is designed for house pets, and the litter box is designed to be used by the pet whenever the urge arises. Primarily, the device is confined in a cabinet, having an uncoverable sink in the top and the litter box in the bottom. It also includes plumbing attached to the owner's plumbing, and it further includes a flush system for cleaning the litter box portion.

1 Claim, 4 Drawing Figures

PET BATH AND LITTER BOX COMBINATION

This invention relates to devices for pets, and more particularly, to a pet bath and litter box combination.

The principal object of this invention is to provide a pet bath and litter box combination, which will be adaptable for use with existing cabinets, or will be fabricated as a free-standing unit, for placement in any room.

Another object of this invention is to provide a pet bath and litter box combination, which will include a wash sink within its upper end, for washing a pet easily, while its user is in a standing position.

Another object of this invention is to provide a pet bath and litter box combination, which will include plumbing means, for flushing its litter box in the base portion of the combination.

Another object of this invention is to provide a pet bath and litter box combination, which will be of such design, as to have no free-standing water therein, and it will include a lid, for covering the unit when it is not in use.

A further object of this invention is to provide a pet bath and litter box combination, which will be sanitary at all times, and will have ventilation means fabricated therein, so as to minimize odors.

Other objects are to provide a pet bath and litter box combination, which is simple in design, inexpensive to manufacture, rugged in construction, east to use, and efficient in operation.

These, and other objects, will be readily evident, upon a study of the following specification, and the accompanying drawing, wherein.

Figure 1:
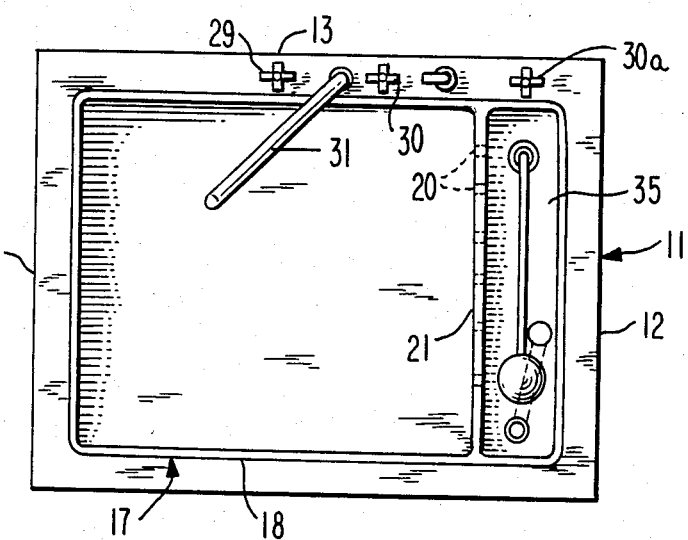
FIG. 1 is a top plan view of the present invention, showing the lid removed therefrom.
Figure 2:
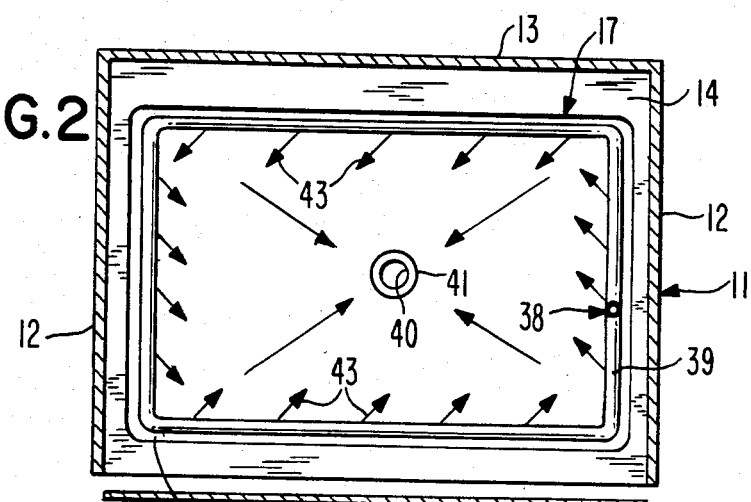
FIG. 2 is a cross-sectional view, taken along the line 2—2 of FIG. 3.
Figure 3:
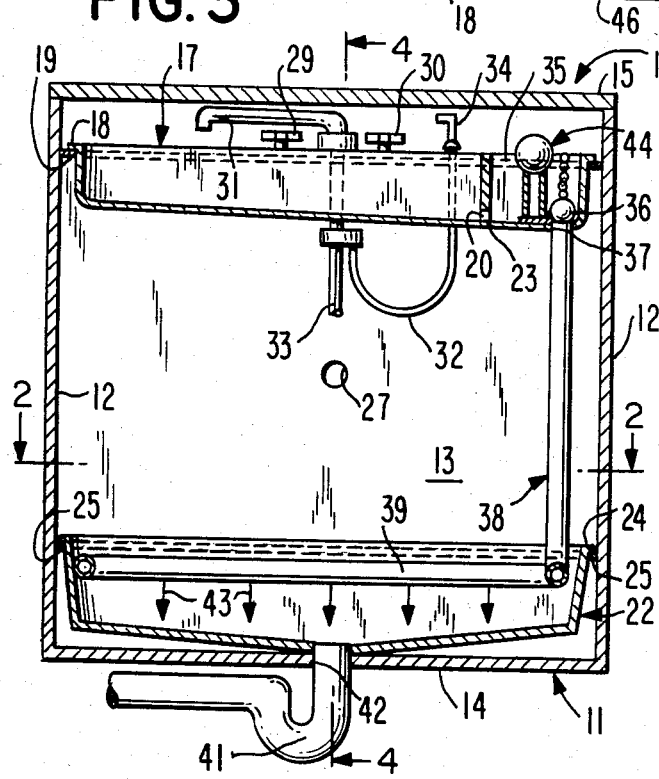
FIG. 3 is a cross-sectional view, taken along the line 3—3 of FIG. 4.
Figure 4:
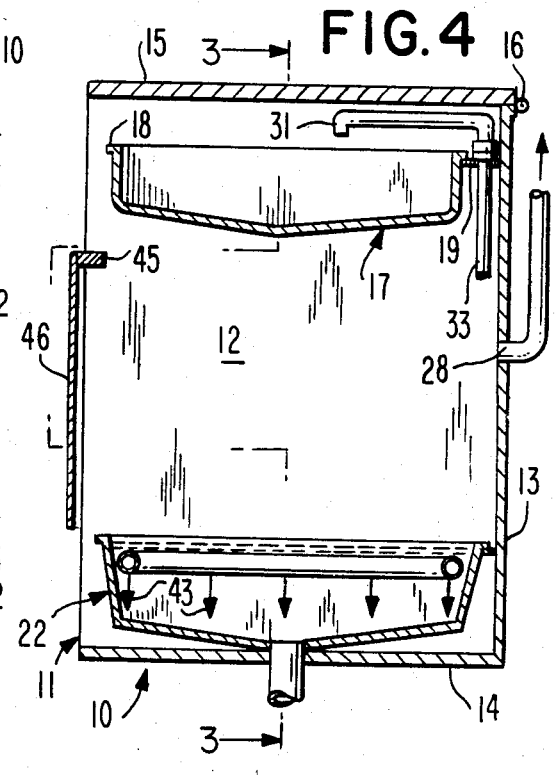
FIG. 4 is a cross-sectional view, taken along the line 4—4 of FIG. 3.

Accordingly, a combination device 10 is shown to include a rectangular cabinet 11, having a pair of side walls 12, a rear wall 13, a bottom wall 14, and a hinged lid 15 is secured to rear wall 13, by hinge 16 means, so as to cover cabinet 11 when it is not in use. A sink 17 is provided in the upper portion of cabinet 11, and includes an upper and outer peripheral flange 18, which engages with rails 19, that are suitably and fixedly secured to the inside surfaces of side walls 12 and rear wall 13. Sink 17 is angled at its bottom right, enabling water therein to drain to the right through openings 20 through divider wall 21, when flushing litter box 22 in the bottom of cabinet 11. Divider wall 21 is fixedly secured, at its side edges and bottom edge 23, to the inside surfaces of sink 17, and litter box 22 includes an outer peripheral flange 24, which is supported upon rails 25, which are fixedly secured to walls 12 and 13 in a suitable manner. Rear wall 13 is also provided with a vent opening 27, which aligns with a vertical vent pipe 28, that is fixedly secured, at its bottom end, over the opening 27. Sink 17 further includes a hot water knob 29, a cold water knob 30, and a faucet 31, the combination being secured to the standard plumbing of the dwelling in which device 10 is used. A spray water pipe 32 is also connected, in a suitable manner, to the water pipe 33 of faucet 31, and includes an adjustable spray nozzle 34, for spraying the pet. The sump 35, defined by divider wall 21 in sink 17, includes a ball and chain valve 36, which is used to seal opening 37 in sump 35, so as to prevent water from traveling downwards through flush pipe 38, which is terminated by a rectangular and perforated ring 39. Litter box 22 is also angled downward at its center, for water to enter its opening 40, into trap pipe 41, which is fixedly secured thereto, and extends through opening 42 through bottom wall 14 of cabinet 11. The water from perforated ring 39 travels in a circulatory direction when being discharged from ring 39, as is illustrated by the arrows 43, and this motion serves to remove all pet waste thoroughly, and flush it to the center opening 40, and out of device 10.

It shall also be noted that the sump 35 is, in effect, a common automatic float valve system 44, and a rod 45 is fixedly secured across the open front of cabinet 11 in a suitable manner, and supports a vinyl curtain 46 thereon, which is easily moved aside by a pet, to use the litter box 22 therein.

In use, device 10 is, first, installed by connecting the pipes 33 and 41 to the proper plumbing pipes within the pet owner's dwelling. The pet is bathed by placing it in the sink 17, and using the faucet 31, which is controlled by the knobs 29 and 30 to fill sink 17. When it is desired to spray the pet, the spray nozzle 34 is used, and water remains in sink 17, by the ball chain valve 36 remaining seated in opening or seat 37. When finished bathing the pet, the ball chain valve 36 is lifted, which causes the water of sink 17 to flow into the flush pipe 38, out of ring 39, and down the trap pipe 41. When it is desired to flush the litter box 22, knob 30a of the cold water is turned on, which fills sink 17 by means of faucet 31, and the water enters the sump 35 via the openings 20 of divider wall 21, and, when the sump 35 is nearly full, knob 30a is turned off, and valve 36 is unseated by the user, which causes the water therein to flow downward and out of ring 39, which flushes box 22, and the water travels into the trap pipe 41 and on into the sewage system.

While various changes may be made in the detail construction, it is understood that such changes will be within the spirit and scope of the present invention, as is defined by the appended claims.

What I now claim is:

1. A pet bathing and litter box combination, comprising, in combination, a cabinet, a sink secured in said cabinet, a litter box secured in said cabinet, and plumbing received in said cabinet; said sink being fixedly secured in the upper portion of said cabinet, and said litter box being secured in the lower portion of said cabinet; and said sink including a sump at one end, and a divider wall being fixedly secured between the side walls and the bottom wall of said sink in a suitable manner, and said divider wall including a plurality of spaced openings through its bottom, adjacent to the top surface of said bottom wall of said sink, such that water, when turned on in said sink, passes through the spaced openings, into said sump, where it remains until a ball chain valve is lifted.

* * * * *